United States Patent [19]

Maurer

[11] 3,930,543

[45] Jan. 6, 1976

[54] TRACTOR ATTACHMENT

[76] Inventor: Richard G. Maurer, 6520 W. Freeland Road, Freeland, Mich. 48623

[22] Filed: Mar. 22, 1974

[21] Appl. No.: 453,991

[52] U.S. Cl. ............... 172/273; 172/274; 172/298; 172/776
[51] Int. Cl. ................ A01b 51/00; A01b 59/044
[58] Field of Search.... 172/297, 298, 303, 300–308, 172/273, 274, 307, 308, 439, 776; 56/6, 7; 171/62

[56] References Cited
UNITED STATES PATENTS

| | | | |
|---|---|---|---|
| 1,870,740 | 8/1932 | Leiter | 172/273 X |
| 2,005,440 | 6/1935 | Sciarini | 172/307 |
| 2,424,372 | 7/1947 | Silver | 172/298 |
| 2,426,530 | 8/1947 | Silver | 172/300 X |
| 2,754,740 | 7/1956 | Kirby | 172/297 |
| 2,936,561 | 5/1960 | Grimes | 56/7 |

*Primary Examiner*—Stephen C. Pellegrino
*Attorney, Agent, or Firm*—Learman & McCulloch

[57] ABSTRACT

A tractor attachment adapted for removable mounting on a tractor to provide support for agricultural implements comprises a substantially U-shaped structure having a pair of spaced, substantially parallel arms joined at corresponding ends by a transverse framework having mounting elements adapted to be connected to a tractor's conventional three-point hitch. At the forward ends of the arms are mounted implements such as bean puller units and the length of the arms is such that the implements occupy a position between the front and rear wheels of the tractor. The arms are hinged between their ends to facilitate the mounting and demounting of the attachment to and from the tractor.

10 Claims, 8 Drawing Figures

TRACTOR ATTACHMENT

The invention disclosed herein relates to a tractor attachment of the kind that is adapted to support agricultural implements such as bean puller units, cultivator units, and the like, the attachment and its associated implements being capable of being mounted on and demounted from the conventional vertically adjustable, three-point hitch carried at the rear end of the tractor. By adapting the attachment for coupling to the tractor's three-point hitch, the coupling and uncoupling of the attachment is considerably faster and easier to accomplish than is the case with conventional implement-supporting attachments. In addition, such mounting of the attachment permits the latter to be raised and lowered by the tractor's hitch mechanism.

It is conventional practice to provide attachments adapted to support harvesting or cultivating implements and to construct the attachments in such manner that they removably may be mounted on a tractor. In most instances an attachment of this kind is adapted for use with a particular manufacturer's tractor with the result that the attachment is not capable of being used on all tractors. Since tractor designs and sizes change from time to time it frequently occurs that an attachment which was usable on an earlier tractor cannot be used on a later model tractor without substantial modification of the attachment, the tractor and attachment mounting devices, or both.

Conventional implement-supporting attachments for tractors have recognized the desirability of positioning the implements between the front and rear wheels of a tractor so as to minimize the concentration of weight at the forward wheels and reduce the tendency of such wheels to become embedded in soft ground. However, in those instances in which a tractor attachment supports implements that are adapted to span several rows of crops, positioning of the implements between the front and rear wheels of the tractor has complicated considerably the mounting of such an attachment on a tractor. That is, it is not uncommon for the attachment and the implements to be composed of a number of individual pieces which first must be laid along the ground between the tractor's front and rear wheels and then coupled to one another and to the tractor.

A principal object of the invention is to overcome the problems associated with conventional attachments of the kind referred to and this object is achieved by the provision of an attachment which is adapted for connection to the three-point hitch that is found on virtually every modern tractor and by incorporating in the attachment a pair of arms on which implements may be mounted, the arms being hinged between their ends so as to enable the implements to be swung to and from positions in which they extend transversely of the tractor and are located between the front and rear wheels thereof.

Other objects and advantages of the invention will be pointed out specifically or will become apparent from the following description when it is considered in conjunction with the appended claims and the accompanying drawings, in which:

FIG. 4 is an enlarged view of a portion of the apparatus as viewed in the direction of the arrows 4—4 in FIG. 1;

FIG. 5 is a sectional view taken on the line 5—5 of FIG. 1;

FIG. 6 is an enlarged, sectional view taken on the line 6—6 of FIG. 2;

FIG. 7 is an enlarged, sectional view taken on the line 7—7 of FIG. 2; and

Figure 1:
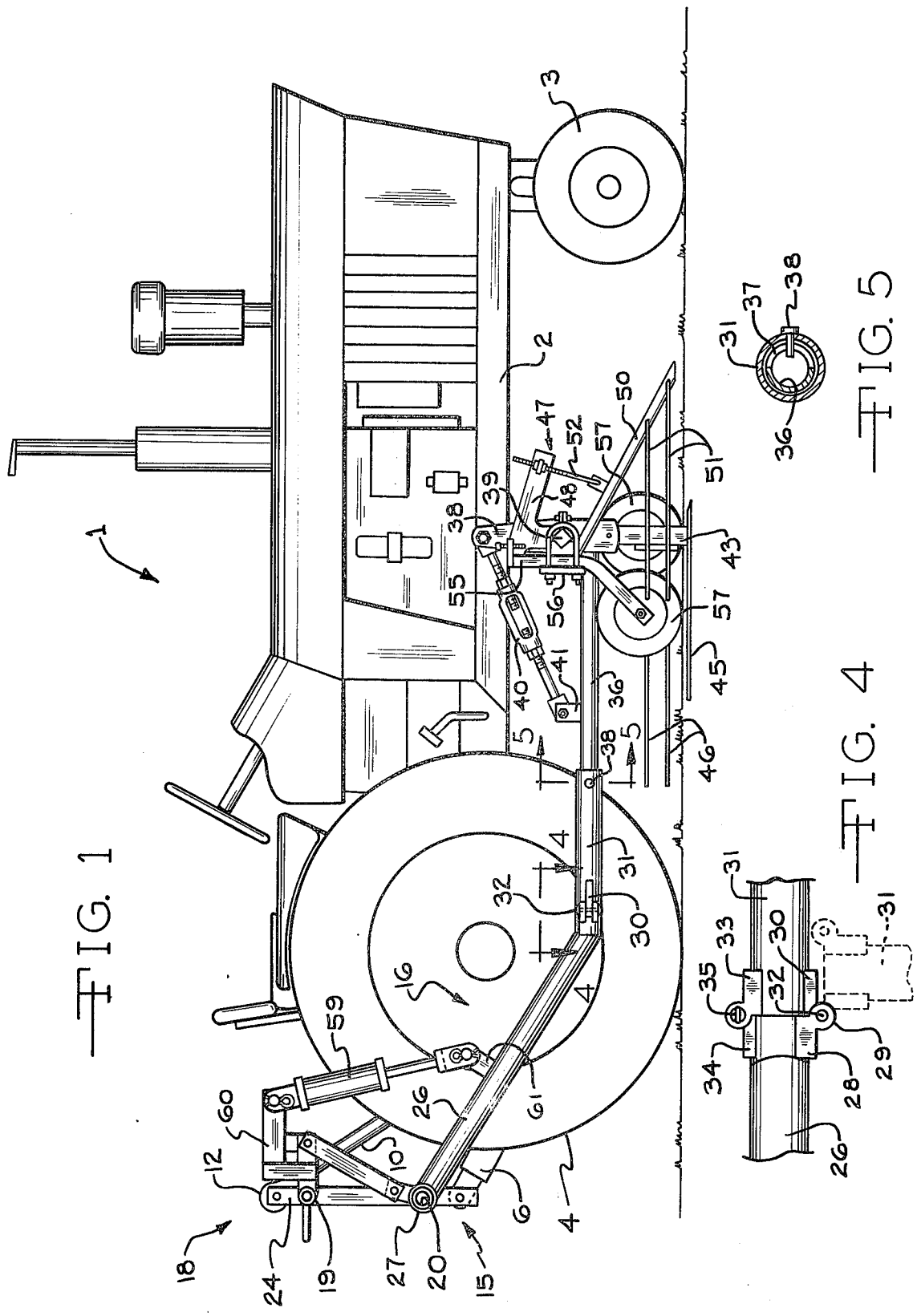
FIG. 1 is a side elevational view of a tractor fitted with an attachment constructed in accordance with the invention, the attachment supporting implements in condition for use.

Apparatus constructed in accordance with the invention is adapted for use in conjunction with a conventional tractor 1 having a chassis 2 on which are mounted spaced apart front and rear wheels 3 and 4, respectively. At the rear end of the tractor is a conventional, vertically adjustable, three-point hitch assembly 5 comprising a pair of parallel links 6 and 7 pivoted to the chassis 1 as at 8 for rocking movements in a substantially vertical plane. Hydraulic rams 9, forming part of the tractor's conventional equipment, are connected to the links 6 and 7 so as to swing the latter. The hitch assembly 5 also includes a turnbuckle 10 that is pivoted at one end to a fixture 11 on the chassis 1 and terminates at its other end in an eye 12. A rearwardly extending drawbar 13 is fixed to the chassis 1, as is conventional.

An attachment constructed according to the invention comprises a generally U-shaped structure 15 having a pair of substantially parallel, spaced apart arms 16 and 17 joined at corresponding ends by a transverse framework 18.

The framework 18 comprises a truss-like structure having parallel upper and lower members 19 and 20 between which extends a plurality of reinforcing bars 21. Fixed on the lower bar 20 is a pair of attaching lugs or bars 22 which are adapted to be coupled by removable pins 23 to the links 6 and 7. Fixed to the upper member 19 is a pair of attaching ears 24 between which the eye 12 may be accommodated and removably secured by means of a pin 25. The arrangement and spacing of the members 22 and 24 are such that they are compatible with the elements of the three-point hitch 5 so as to assure the quick and easy assembly and disassembly of the framework 18 with and from the hitch 5.

The arm 16 of the attachment is composed of a number of individual members. The rearmost arm member 26 is secured to a sleeve 27 which rotatably receives the adjacent end of the frame member 20 so as to provide a rotatable coupling of the arm 16 with the framework 18 for a purpose presently to be explained. At its forward end the arm member 26 carries a fitting 28 having a pair of hinged knuckles 29 between which is accommodated a hinge lug 30 that is carried by an elongate, cylindrical member 31 forming part of the arm 16. A hinge pin 32 extends through the knuckles 29 and the lug 30 so as to enable the intermediate arm member 31 to rock about a substantially vertical axis between the positions shown in full and dotted lines in FIG. 4. That end of the forward arm member 31 which is adjacent the arm member 26 carries a fitting 33 which is adapted to overlie a similar fitting 34 carried by the arm member 26, and each of the fittings 33 and 34 is provided with openings for the removable accommodation of a locking pin 35 by means of which the arm members 26 and 31 may be fixed against hinging movement.

The forward arm member 31 accommodates the rearward end of an elongate mounting member 36 which extends in prolongation of the arm 16. That end of the member 36 which telescopes into the arm member 31 preferably has a circumferential slot 37 of about 180° in length so as to accommodate a pin 38 that is carried by the arm member 31. The pin 38 fits loosely within the slot 37 so as to permit limited relative rotation between the arm members 31 and 36.

The forward end of the member 36 pivotally mounts, as at 37 (FIG. 6), a link 38 in which is fixed a transversely extending, elongate support bar 39. A turnbuckle 40 extends between the upper end of the link 38 and a bracket 41 on the member 36 so as to permit the link 38 to be rocked about the axis of the pivot 37 for a purpose to be explained.

The bar 39 is adapted to support any one or more of a number of different agricultural implements. In the disclosed embodiment, the bar 39 supports three implements 42 known as bean pullers each of which comprises a substantially vertical leg 43 secured at its upper end to the support bar 39 by a clamp 44 and each of which terminates at its lower end in a cutting blade 45. At intervals along its length each leg 43 is provided with obliquely extending windrowing fingers 46 as is conventional. The support bar 39 also is disclosed as supporting implements 47 such as vine separators each of which includes a frame 48 fixed to the support bar 39 by clamps 49 and to which is pivoted a forwardly and downwardly inclined bar 50 to which is affixed obliquely extending windrowing fingers 51. An adjusting rod 52 extends between the bar 50 and the frame 48 and cooperates with a link 53 pivoted to the members 48 and 50 so as to enable the inclination of the bar 50 to be adjusted.

Adjacent opposite ends of the support bar 39 are wheeled units 54 each of which comprises an upstanding leg 55 that is secured by clamps 56 to the bar 39 and which, at its lower end, has a wheel 57 journaled thereon. An adjusting screw 58 enables the height of the wheel 57 to be adjusted relatively to the ground.

The arm 17 corresponds exactly to the arm 16. Accordingly, those parts of the arm 17, together with its associated parts, which are illustrated in the drawings are identified by corresponding reference characters followed by the suffix a.

Except in those instances in which the attachment 15 is to be used, it is not mounted on the tractor. Instead, it is stored in a convenient place. When it is desired to make use of the attachment, it is laid upon the ground and the locking pin 35 removed from the fittings 33 and 34 so that the arm member 31, together with the associated implements 42, may be swung to a position substantially normal to the arm member 26. The hinged portion of the arm 17 is manipulated similarly. The tractor 1 then may be driven to a position from which it may be backed toward the framework 18 and between the arms 16 and 17 until such time as the three-point hitch 5 is adjacent the framework 18. In this position of the tractor the hinged portions of the arms 16 and 17 may be swung back to their original positions and locked by means of the locking pin 35 and the corresponding pin for the arm 17. The overall length of each arm 16 and 17 is such that, when the tractor's rear wheels 4 are adjacent the framework 18, there is sufficient clearance between the front and rear wheels of the tractor to permit the implements to occupy a position between the front and rear wheels and extend transversely of the longitudinal axis of the tractor.

The hydraulic rams 9 of the tractor may be operated so as to enable the links 6 and 7 of the hitch 5 to be joined to the mounting elements 22 of the framework 18, following which the eye 12 may be joined to the ears 24 of the framework. The attachment 15 then is mounted on the tractor.

To facilitate movement of the tractor and the attachment between a barn or the like and a field, the attachment preferably includes a hydraulic operating ram 59 associated with the arm 16 and a similar ram 59a associated with the arm 17. The ram 59 extends between a mounting bracket 60 supported by the framework 15 and an ear 61 carried by the arm member 26, and similar elements are provided for the arm 17. Upon contraction of the rams 59, 59a, the arms 16 and 17 will be rocked upwardly in a vertical plane via the rotatable couplings 27, 27a so as to elevate the forward ends of the arms and the implements supported thereon. Conversely, extension of the rams 59, 59a will lower the arms and the implements supported thereon. Hydraulic fluid for operating the rams 59, 59a may be carried in a reservoir (not shown) forming part of the attachment 15 and, similarly, the attachment may include a hand-operated pump (not shown). Alternatively, the rams 59, 59a may be coupled by hydraulic lines (not shown) to the hydraulic system of the tractor.

The clamps by means of which the implements 42 and 47 and the wheel units 54 are secured to the support bars 39 are adjustable so as to enable the implements and wheel units to be adjusted transversely according to the spacing between rows of crops or the like in a field. In the disclosed embodiment, the implements 42 are adapted to harvest beans which are attached to plants P arranged in rows that are substantially uniformly spaced apart. Thus, the implements 42 should be so adjusted that their blades 45 are adapted to be aligned with the rows of plants P, whereas the wheels 57 should be adjusted so that they pass between adjacent rows.

In the harvesting of beans, the plants P preferably are severed from their roots at a point slightly below ground level. Accordingly, the blades 45 should be so adjusted that, as the tractor traverses a field, the blades 45 will pass slightly beneath the surface of the ground. Blade adjustment is effected by the rams 59, 59a, and the vertical adjustment of the wheels 57. Such adjustment of the blades may change their inclination. The inclination of the blades 45, 45a may be adjusted to that desired, however, by manipulation of the turnbuckles 40, 40a to effect rocking of the lever 38 and of the rod 39 about its own longitudinal axis.

In the embodiment disclosed there are sufficient implements 42 to harvest six rows of beans simultaneously. It will be understood that either fewer or more implements 42 may be mounted on the supports 39, 39a.

Figure 2:
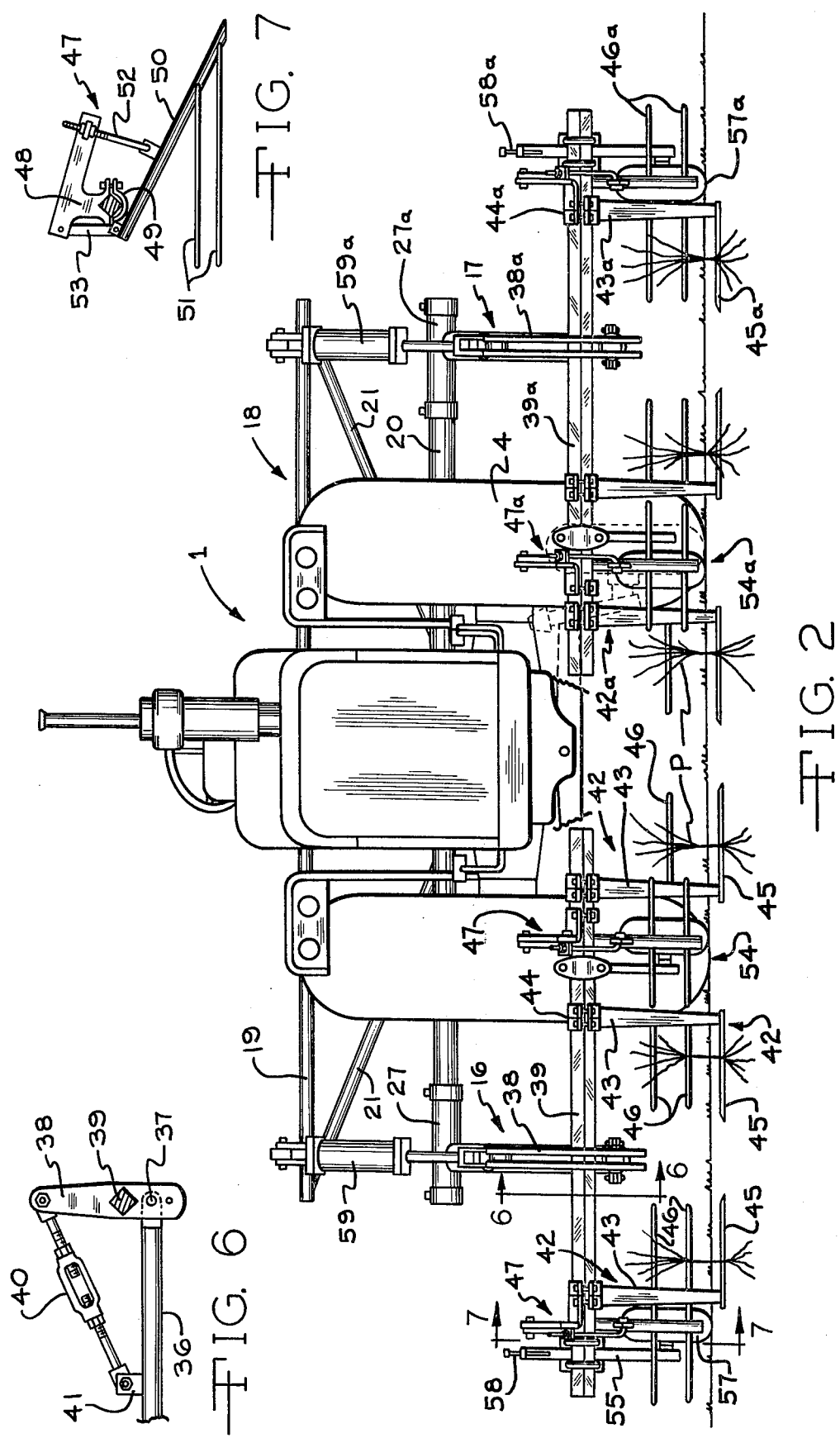
FIG. 2 is a front elevational view.
Figure 3:
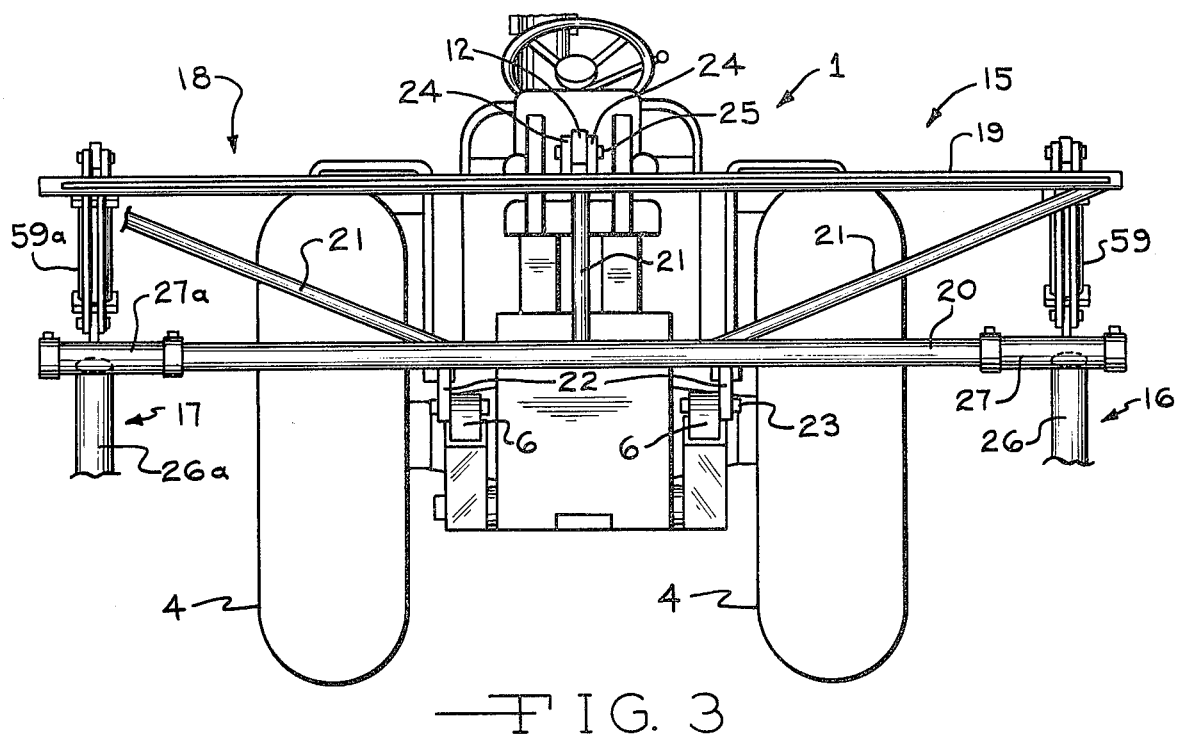
FIG. 3 is a fragmentary, rear elevational view.
Figure 8:
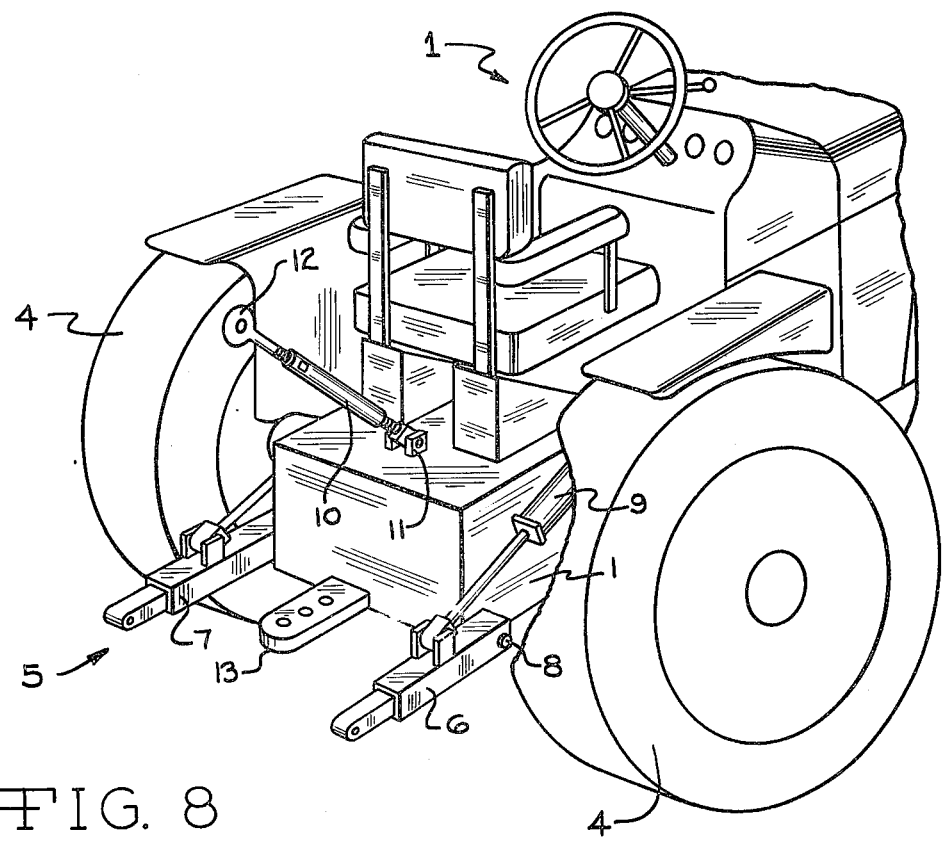
FIG. 8 is a fragmentary, isometric view illustrating a typical tractor's three-point rear hitch.

Not all fields are perfectly level. Accordingly, as the tractor traverses the field the individual wheel units 57 may encounter low or high zones. It is to enable the several implements supported on each support 39, 39a to compensate for high and low zones that the forward arm members of the arms 16 and 17 are relatively rotatable. For example, if the left-hand outboard wheel 57, as viewed in FIG. 2, encounters a low zone, the arm member 36 may rotate counterclockwise about the longitudinal axes of the arm members 31 and 36.

The rearmost arm members 26, 26a are inclined upwardly so that, when the tractor and attachment are utilized to harvest beans or the like, the framework 15 is supported at a level sufficiently above the tractor drawbar 13 to enable a windrower (not shown) to be coupled to the drawbar.

To demount the attachment from the tractor it is necessary only to reverse the steps hereinbefore described for mounting the attachment on the tractor.

The disclosed embodiment is representative of a presently preferred form of the invention, but is intended to be illustrative rather than definitive thereof. The invention is described in the claims.

I claim:

1. A tractor attachment adapted for removable connection to hitch apparatus at the rear end of a tractor, said attachment comprising frame means adapted to extend transversely of a tractor; a pair of elongate, spaced apart, parallel arms having forward and rearward ends, each of said arms being hinged between its ends; releasable locking means for selectively enabling and disabling hinging movement of said arms; means rotatably coupling said arms at their rearward ends to said frame means and adjacent opposite ends thereof whereby said arms extend in the same direction from said frame means and are rotatable relative to said frame means in a substantially vertical plane; implement support means for each of said arms; means mounting said support means on the forward ends of the associated arms and transversely thereof; attaching means carried by said frame means between its ends for removably mounting said frame means on the hitch apparatus of a tractor; and operating means connecting each of said arms to said frame means for swinging said arms vertically independently of the hitch apparatus.

2. An attachment according to claim 1 wherein each of said support means is mounted by its mounting means for rocking movement about the longitudinal axis of its associated arm.

3. An attachment according to claim 2 including means acting between the mounting means of each of said support means and the associated arm for limiting rocking movement of said support means.

4. An attachment according to claim 3 wherein the means for limiting rocking movement comprises a slot in one of said members and a pin carried by the other of said members and accommodated in said slot.

5. An attachment according to claim 1 wherein each of said support means is mounted by its mounting means for rocking movement about its own longitudinal axis.

6. An attachment according to claim 5 including means connected to each of said support means for rocking the latter about its longitudinal axis.

7. An attachment according to claim 1 wherein said attaching means comprises means forming three anchor points.

8. An attachment according to claim 1 wherein each of said arms includes a cylindrical portion and wherein the associated mounting means includes a member in telescoping relation with said cylindrical portion.

9. An attachment according to claim 1 including means acting between said support means and said mounting means for rocking said support means about its longitudinal axis.

10. A tractor attachment adapted for removable connection to vertically adjustable hitch apparatus at the rear of a tractor having a drawbar at the rear thereof, said attachment comprising frame means adapted to extend transversely of a tractor; a pair or elongate, spaced apart, parallel arms having front and rear ends, each of said arms having a substantially horizontal portion from which extends an upwardly and rearwardly inclined rearward portion; means rotatably coupling the rear ends of said arms to said frame means adjacent opposite ends thereof whereby said arms extend in the same direction from said frame means and are rotatable relative to said frame means in a substantially vertical plane; implement support means for each of said arms; means mounting said support means on the front ends of the associated arms; attaching means carried by said frame means between its ends for removably mounting the latter on the hitch apparatus of a tractor and for upward movement adjustment in response to vertically upward adjustment of the hitch apparatus to a position in which said attaching means is at a level above that of the drawbar; and operating means connecting each of said arms to said frame means for swinging said arms vertically independently of the hitch apparatus.

* * * * *